July 21, 1925. 1,546,362
F. BEEMER
BEARING
Filed May 27, 1921
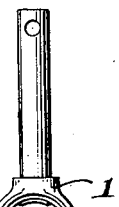
Fig.1.
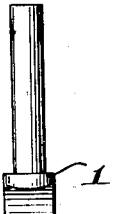
Fig.2.
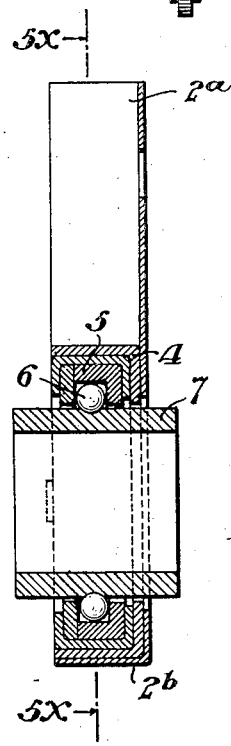
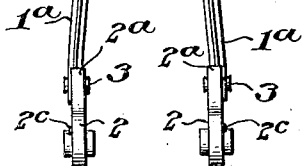
Fig.5.
Fig.4.
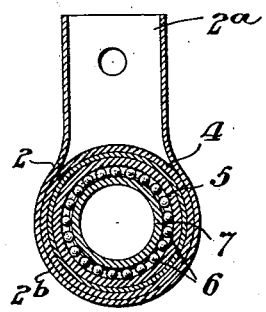
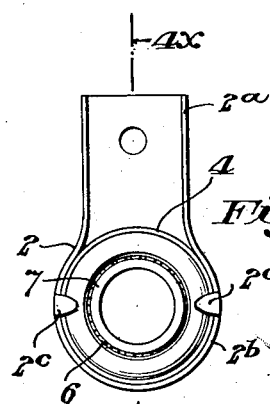
Fig.3.
Inventor
Frank Beemer
By Butler & Denny
Attorneys.

Patented July 21, 1925.

1,546,362

UNITED STATES PATENT OFFICE.

FRANK BEEMER, OF PHILADELPHIA, PENNSYLVANIA.

BEARING.

Application filed May 27, 1921. Serial No. 473,143.

*To all whom it may concern:*

Be it known that I, FRANK BEEMER, a citizen of the United States, residing at Philadelphia, in the county of Philadelphia and State of Pennsylvania, have invented certain Improvements in Bearings, of which the following is a specification.

This invention relates to improvements in bearings comprising anti-friction mechanism for connecting a wheel with a support, and it is designed for connecting a bicycle wheel with the frame fork, but it will be understood that it is not limited to such use, as it is applicable to connecting sheaves, trolleys and the like with supports therefor.

The improvements are characterized, in the preferred construction, by the combination with a ball bearing, of a pressed sheet metal encasing ring having an L-shaped cross section, and a pressed sheet metal shoe provided with a cup or seat having clips for holding said ring therein, and an outwardly projecting seat for engaging a supporting member.

The leading objects of the invention are to provide a bearing that avoids the inaccuracies and unreliability of the usual malleable iron castings, and to provide a construction that is true, light, strong, durable, easily assembled, and preventing the axial movement of the bearing relatively to its support.

In the accompanying drawings, Fig. 1 is a front elevation of a fork having my improvements applied thereto; Fig. 2 is a side view of the construction shown in Fig. 1; Fig. 3 is a side view of a detached bearing embodying the improvements; Fig. 4 is an enlarged sectional view taken on the line 4ˣ—4ˣ of Fig. 3, and Fig. 5 is a reduced view taken on the line 5ˣ—5ˣ of Fig. 4.

The invention, as illustrated in the drawings, is applied to a fork 1 having the bifurcations 1ᵃ. Shoes 2, of pressed sheet metal, have the outwardly extending seats 2ᵃ of U-shaped cross section, in which the extremities of the bifurcations 1ᵃ are fixed, as by the rivets 3, the sides of the seats being adapted to spring so that the bifurcations can be entered therein by pressure in closely fitted relation. A pressed metal ring or cup 4, L-shaped in cross section, has set therein by pressure, the composite outer circular race ring 5, in which run balls 6, held in engagement therewith by the inner circular race ring or bushing 7, the latter being adapted for making a fixed engagement with the hub of a wheel. The ring 4 and the ball bearing mechanism engaged therein are thrust into the circular seat 2ᵇ of the shoe 2, making a press fit therewith, and are held in place by the shoe's lugs 2ᶜ, which are bent inwardly.

Having described my invention, I claim:

1. In a bearing mechanism, the combination with an anti-friction device of a sheet metal shoe therefor comprising a web having a peripheral flange curved about an arc forming more than a half circle but less than a full circle and forming a seat for said device, said web having a flanged section extending radially from said device.

2. In a bearing mechanism, the combination with an anti-friction device of a shoe therefor comprising a web having a curved band extending transversely to the plane thereof and forming a seat for said device, and means turned over from said band and overlapping said device for securing it in its seat.

3. In a bearing mechanism, the combination with an anti-friction device of a shoe therefor comprising an apertured web having a curved flange around the periphery thereof adjacent to said aperture and forming with said web a seat for said device, said shoe having a member extending outwardly from said device and containing a recess of substantially U-shaped cross section communicating with said seat.

4. In a bearing mechanism, the combination of a connector comprising an apertured web having flanges along edges thereof and a curved band adjacent to said aperture, an anti-friction device seated within said curved band and having a member projecting through the adjacent aperture, and lugs bent from said connector and securing said device in its seat.

Signed at Philadelphia, county of Philadelphia and State of Pennsylvania, this 26th day of May, 1921.

FRANK BEEMER.